United States Patent [19]

Johnson

[11] 4,252,547
[45] Feb. 24, 1981

[54] GAS CLEANING UNIT

[76] Inventor: Kenneth O. Johnson, Rte 5, River Haven, St. Cloud, Minn. 56301

[21] Appl. No.: 12,298

[22] Filed: Feb. 15, 1979

[51] Int. Cl.³ .................. B01D 47/02; B01D 50/00
[52] U.S. Cl. ......................... 55/234; 55/279; 55/316; 55/470; 55/472; 55/484; 55/504; 55/511; 261/72 R; 261/104; 422/120
[58] Field of Search ................ 55/234, 279, 316, 467, 55/470, 472, 478, 484, 480-481, 501, 504-506, 511; 261/72 R, 102, 104; 422/120

[56] References Cited

U.S. PATENT DOCUMENTS

| 711,188 | 10/1902 | Stone | 55/478 |
|---|---|---|---|
| 1,243,472 | 10/1917 | Wilson | 55/234 |
| 1,794,447 | 3/1931 | De Bothezat . | |
| 1,810,613 | 6/1931 | Keller | 55/279 X |
| 1,916,907 | 7/1933 | Sargent | 55/481 X |
| 2,514,720 | 7/1950 | Rennels | 55/279 X |
| 2,609,888 | 9/1952 | Beringer . | |
| 2,749,725 | 6/1956 | Essman et al. | 55/234 X |
| 2,911,291 | 11/1959 | Engel . | |
| 3,129,268 | 4/1964 | Evett | 55/234 X |
| 3,217,470 | 11/1965 | Omohundro | 55/470 X |
| 3,273,323 | 9/1966 | Whitfield . | |
| 3,299,620 | 1/1967 | Hollingworth . | |
| 3,370,403 | 2/1968 | D'Elia et al. . | |
| 3,465,504 | 9/1969 | Oropeza et al. | 55/228 |
| 3,496,703 | 2/1970 | MacLeod et al. | 55/234 |
| 3,537,239 | 11/1970 | Dunmire | 55/242 |
| 3,616,624 | 11/1971 | Marsh | 55/472 |
| 3,619,988 | 11/1971 | Cornell | 55/234 |
| 3,621,834 | 11/1971 | Keuls | 55/234 |
| 3,668,840 | 6/1972 | Pierick | 55/239 |
| 3,722,182 | 3/1973 | Gilbertson | 55/124 |
| 3,744,216 | 7/1973 | Halloran | 55/234 X |
| 3,747,300 | 7/1973 | Knudson | 55/126 |
| 3,750,370 | 8/1973 | Brauss et al. | 55/316 X |
| 3,757,495 | 9/1973 | Sievers | 55/316 X |
| 3,828,530 | 8/1974 | Peters | 55/473 |
| 3,868,896 | 3/1975 | Doll et al. | 98/2.11 |

FOREIGN PATENT DOCUMENTS

| 2370237 | 7/1978 | France | 55/279 |
|---|---|---|---|
| 287514 | 3/1971 | U.S.S.R. | 55/316 |

Primary Examiner—Kathleen J. Prunner
Attorney, Agent, or Firm—Burd, Bartz & Gutenkauf

[57] ABSTRACT

A portable gas cleaning unit having a box-shaped housing supporting filters operable to remove particulates, pollens, odors, and smoke from a gas, as air. A motor driven fan located within the housing moves gas through the filters and discharges cleaned gas to the environment outside of the housing. In one form of the invention, the motor is a D. C. motor powered by a 12-volt battery. The filters are mounted in a recess in the top wall of the housing and include a coarse fiber filter and a particulate charcoal filter. A protective open rectangular grid is located over the fiber filter and is mounted with a tight fit on the top wall to hold the filters in the recess. An open top tank is located within the housing for carrying a liquid, as water. Vapor plates mounted on the tank are used to facilitate the evaporation of liquid into the gas flowing through the housing. The tank has a longitudinal extension adapted to move through an opening in a side wall of the housing to allow liquid to be placed into the tank.

24 Claims, 13 Drawing Figures

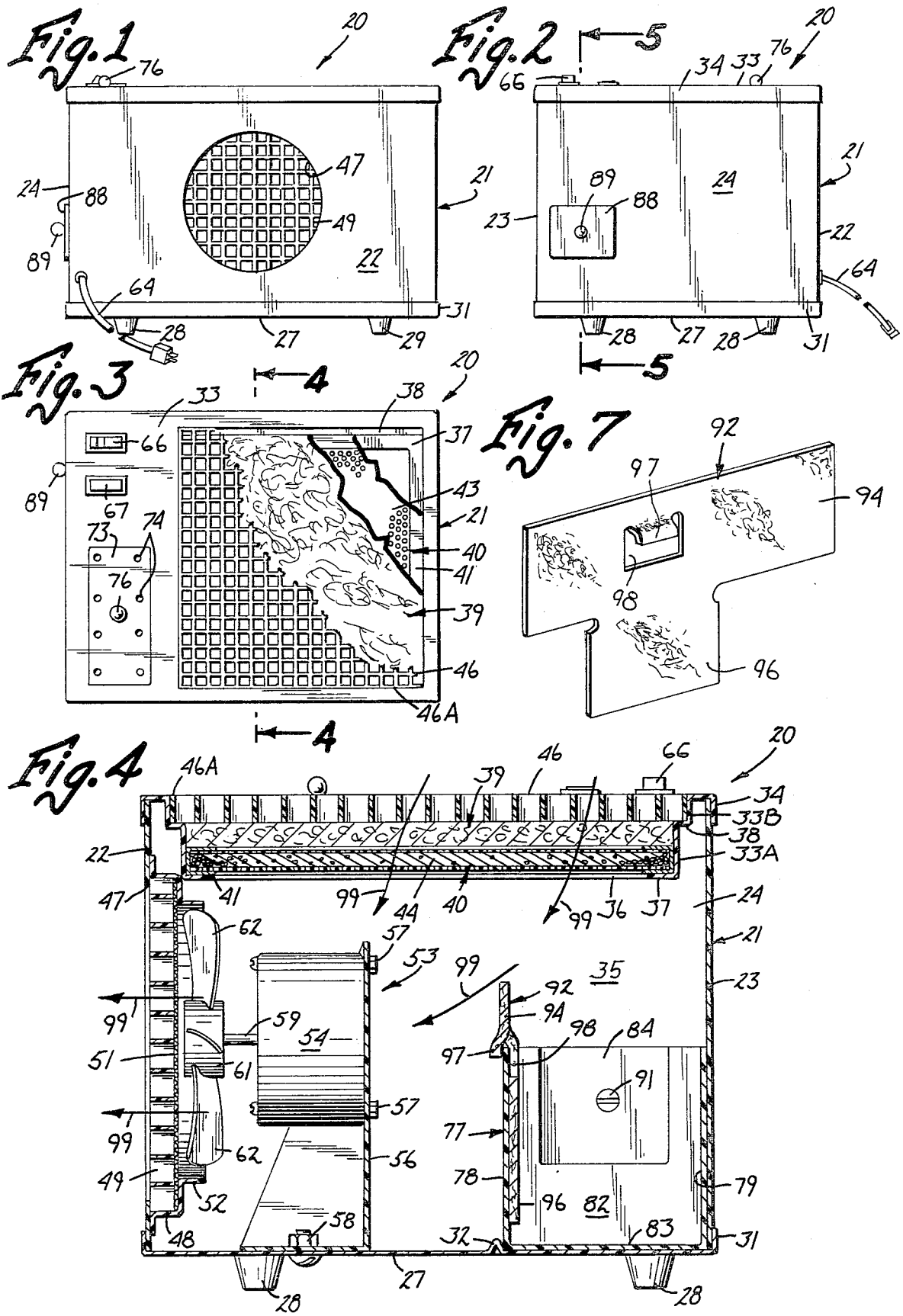

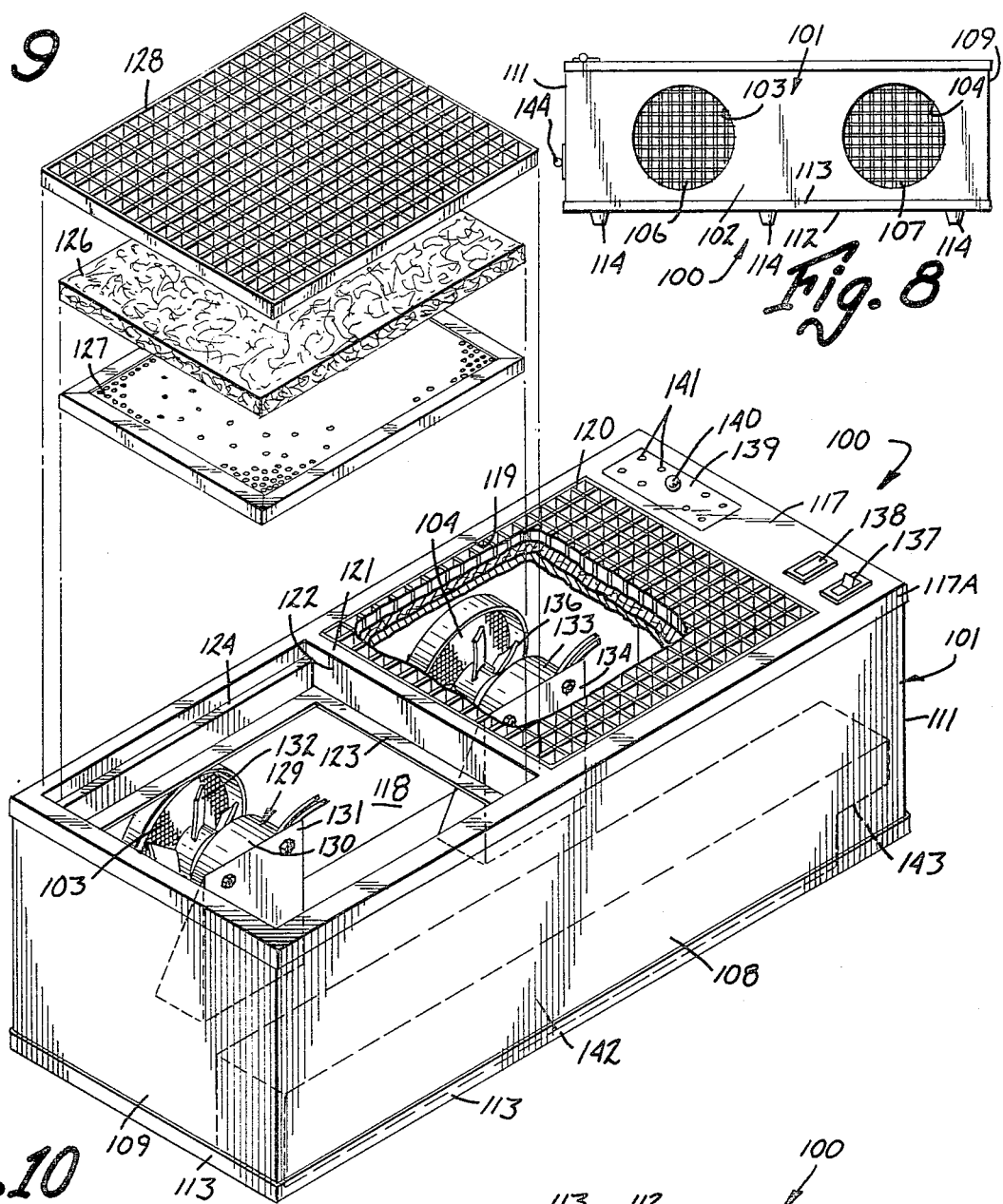
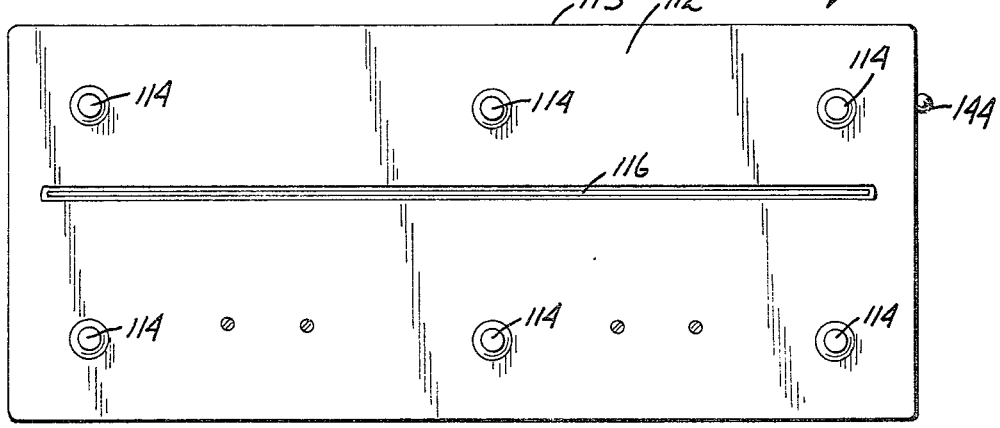

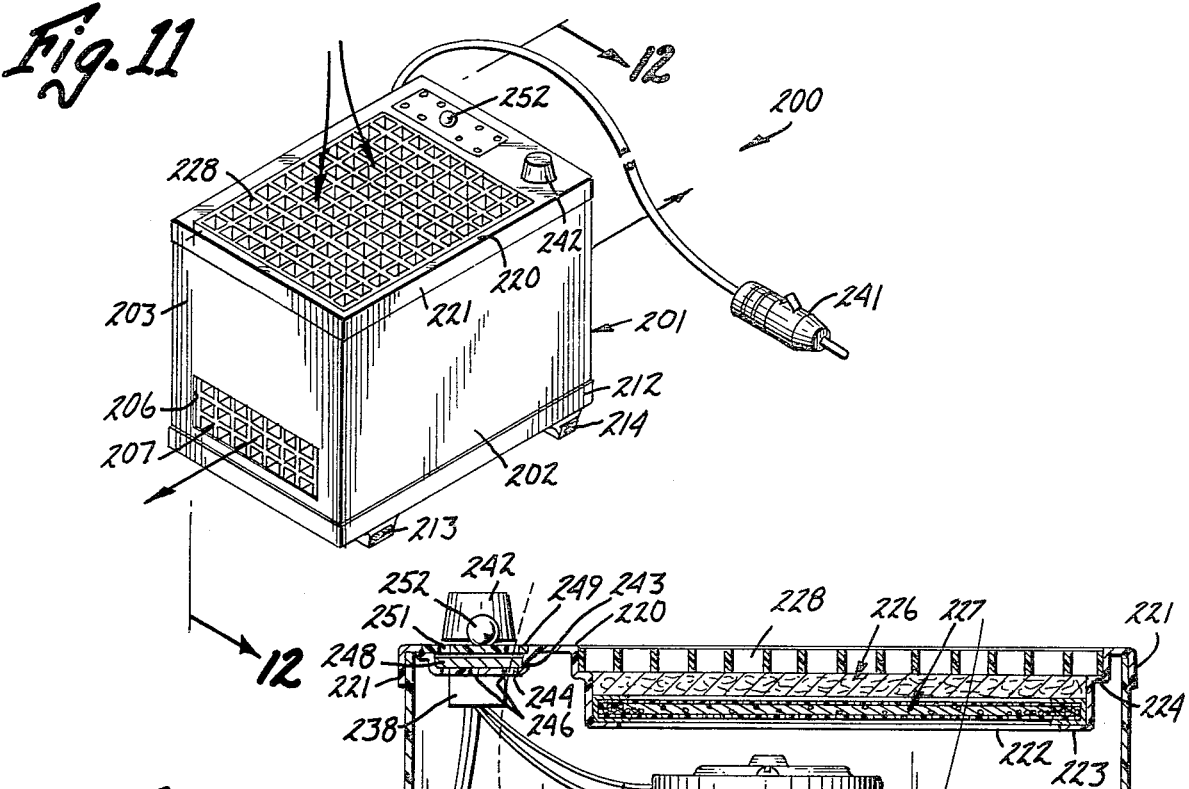
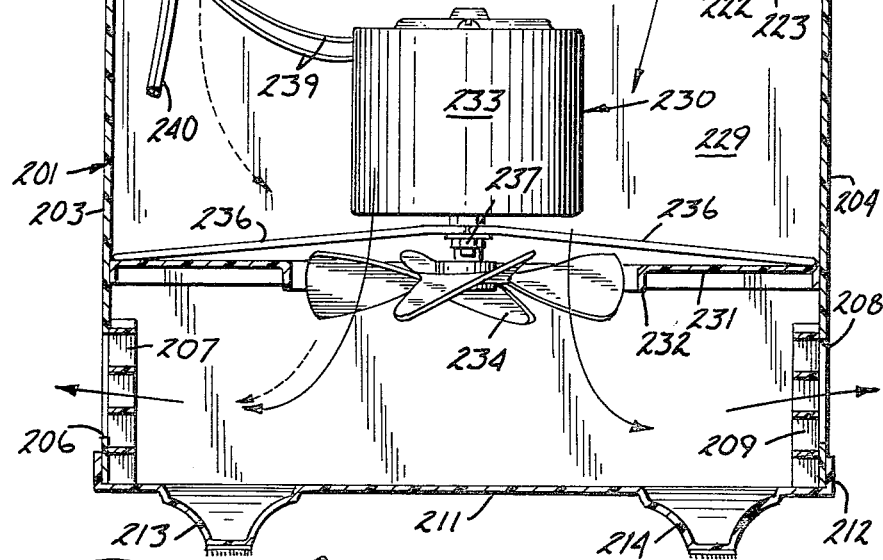
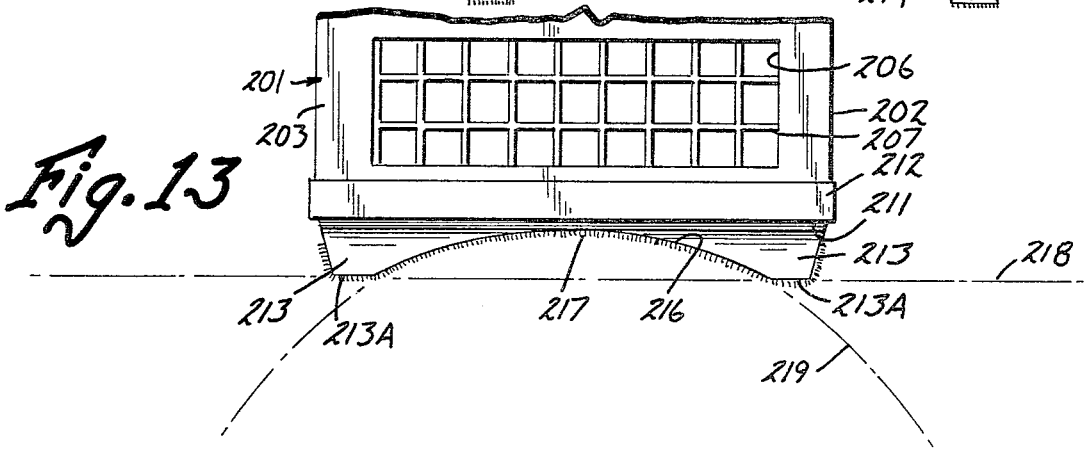

4,252,547

GAS CLEANING UNIT

SUMMARY OF THE INVENTION

The invention is directed to an apparatus for removing foreign matter as, particulates, smoke, pollens, odors, and dust from a gas, such as air. More particularly, the invention is an air cleaning unit for removing airborne particles, smoke and odors from air in an enclosed environment, such as a room or the interior of a motor vehicle.

The air cleaning unit has a box-shaped housing enclosing a chamber. An air moving means, such as a motor driven fan located in the chamber, is operable to move air through a plurality of filters and discharge the air externally of the housing. The housing has a top wall having a recess to accommodate a first fiber filter and a second particle filter, such as a charcoal filter. An open grid mounted in the recess on the top wall covers the filters. A tank containing liquid, as water, is located in the chamber below the filters. A plurality of vapor plates mounted on one wall of the tank facilitates the evaporation of the water into the air moving through the chamber. The tank has a longitudinal extension adapted to move through an opening in an end wall of the housing to facilitate adding water to the tank. The top wall of the housing has a second recess accommodating a pad for holding air freshener compound. A cover fits into the recess to hold the pad in assembled relation with the top wall.

In one form of the gas cleaning unit, a 12-volt D.C. motor is located within the housing to drive a fan. The motor is connected to a switch control mounted on the top wall of the housing. The switch control is connected with suitable lines to a battery of a vehicle, such as a car or van. The motor and fan are mounted on an intermediate wall located within the chamber with a plurality of flexible arms. The motor operates the fan to draw air through a plurality of filters mounted on the top wall. The air is discharged through outlet openings in the bottom portions of the end walls of the housing. The bottom of the housing is provided with strips of hook-like elements operable to releasably attach to loop fibers such as carpeting.

An object of the invention is to provide an efficient, low-cost portable air cleaning unit operable to remove smoke, odors, and foreign particulates from the air and discharge clean air into a selected location. Another object of the invention is to provide an air cleaning unit that increases the moisture content or relative humidity of the air in an enclosed environment. A further object of the invention is to provide an air cleaning unit that has a plurality of air filtering elements that can be readily removed for cleaning and replacement. These and other objects and advantages of the invention are in the following detailed description of the gas cleaning unit.

IN THE DRAWINGS

FIG. 1 is a front elevational view of a gas cleaning unit of the invention;

FIG. 2 is an end elevational view of the left end of FIG. 1;

FIG. 3 is a top view of FIG. 1 with parts broken away;

FIG. 4 is an enlarged sectional view taken along line 4—4 of FIG. 3;

FIG. 7 is a perspective view of a vapor plate shown in FIG. 4;

FIG. 8 is a front elevational view of a first modification of the gas cleaning unit of the invention;

FIG. 9 is an enlarged perspective view of FIG. 8 showing one end, the back side, and top thereof with the grid and filters of one section removed;

FIG. 10 is a bottom view of FIG. 9;

FIG. 11 is a perspective view of a second modification of the gas cleaning unit of the invention;

FIG. 12 is an enlarged sectional view taken along line 12—12 of FIG. 11; and

FIG. 13 is an end view of a lower part of FIG. 11.

DESCRIPTION OF PREFERRED EMBODIMENT

Figure 5:
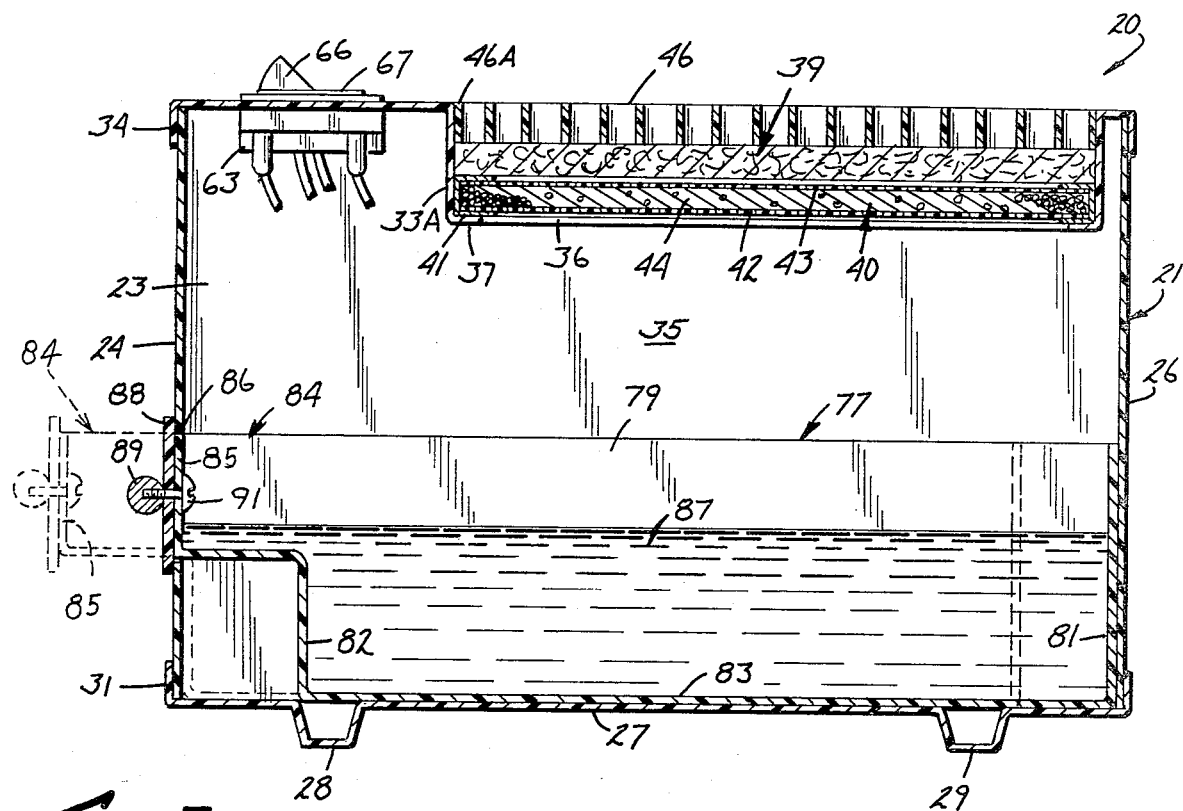
FIG. 5 is an enlarged sectional view taken along line 5—5 of FIG. 2.

Referring to FIGS. 1–7, there is shown a portable gas cleaning unit indicated generally at 20 operable to remove smoke, pollens, odors, and particulates from gas, such as the air. The following description will be limited to the cleaning of air in an enclosed environment, such as a room. Other types of gases can be cleaned with unit 20.

Air cleaning unit 20 has a box-shaped housing indicated generally at 21 comprising front wall 22, back wall 23, and end walls 24 and 26. Walls 22, 23, 24 and 26 are joined to a bottom wall 27 having a plurality of supporting feet 28 and 29. Bottom wall 27 has an upwardly directed peripheral flange or lip 31 that overlaps walls 22, 23, 24 and 26 and is secured thereto with suitable adhesive or bonding material. As shown in FIG. 4, bottom wall 27 has a transverse upwardly directed rib 32 which serves as a longitudinal guide for a liquid holding tank indicated generally at 77.

The top of housing 21 is closed with a top wall 33 to define the interior chamber 35 of the housing. The outer peripheral edge of top wall 33 has a downwardly directed flange 34. Suitable adhesive or bonding material secures flange 34 to housing walls 22, 23, 24 and 26. All of the walls of housing 21 and top and bottom walls are rigid sheet members of plastic, metal, wood, and like materials. Top and bottom walls 27 and 33 can be vacuum formed plastic members. Top wall 33 has an inwardly directed side wall 33A surrounding a generally rectangular inlet opening or entrance 36 for the movement of air into chamber 35. As shown in FIGS. 4 and 5, inlet opening 36 is surrounded with a first bottom shoulder 37 attached to the inner edge of wall 33A. Shoulder 37 is an inwardly directed rectangular flange or lip. A pair of second shoulders 38 are located above first shoulder 37 and below the top surface of top wall 33 on opposite sides of side wall 33A. Air filtering means are supported on shoulder 37. The air filtering means comprises a first fiber or coarse filter 39 located above a second particle filter indicated generally at 40. Filter 40 is a particle filter operable to remove smoke and odor contaminants from the air. Filter 40 has a peripheral generally U-shaped frame 41 attached to laterally spaced upper and lower walls 42 and 43. Walls 42 and 43 have a plurality of holes to facilitate the movement of air through the walls. A filtering medium 44 is located between walls 42 and 43. The filtering medium 44 is preferably granular charcoal. Other types of filtering medium can be used in the filter 40. As shown in FIG. 4 and 5, frame 41 rests on the lip 37. Filter 39 is located on top of filter 40.

A generally rectangular open grid member 46 is located above filter 39. Grid member 46 has a continuous outer band 46A located with a friction fit in engagement with second upright side walls 33B and side walls 33A of top wall 33. Shoulders 38 connect side walls 33A and 33B and support grid member 46 on top wall 33. Grid member 46 has a plurality of linear strips arranged in a rectangular pattern providing square air inlet passages. Other types of grid members can be used to cover and protect filter means 39. Grid member 46 is made of rigid material as plastic, metal or the like.

Referring to FIGS. 1 and 4, front wall 22 of housing 21 has a circular outlet opening 47 to allow air to flow from chamber 35. A rectangular grid member 49 extends over opening 47. A screen 51 is located adjacent the inside of grid member 49. Grid member 49 and screen 51 are held on front wall 22 with a circular frame 48 having an inwardly directed cylindrical shroud 52. Frame 48 is secured to the inside of wall 22 with bonding material or suitable fasteners.

A gas moving means indicated generally at 53 located in chamber 35 operates to move air through filters 39 and 40 and discharge air through grid 49 to the environment outside of housing 21. Air moving means 53 has an electric motor 54 carried by a support or bracket 56. A plurality of bolt and nut assemblies 57 attach motor 54 to bracket 56. Nut and bolt assemblies 58 secure bracket 56 to bottom wall 27. Motor 54 has a horizontal drive shaft 59 attached to a hub 61. A plurality of outwardly directed blades 62 secured to hub 61 function as a fan to move air through chamber 35. Blades 62, as shown in FIG. 4, are partially located within the confines of sleeve or shroud 52 to enhance the air moving efficiency of the fan.

Referring to FIG. 5, a switch 63 is mounted on top wall 33 and connects external power lines 64 to motor 54. Switch 63 has a manual ON-OFF control 66 operable to control the power supply to motor 54. Switch 63 is electrically connected to a light 67 mounted on top wall 33. When the switch 63 is ON, the light is ON, indicating operation of motor 54 and rotation of the fan attached thereto.

Figure 6:
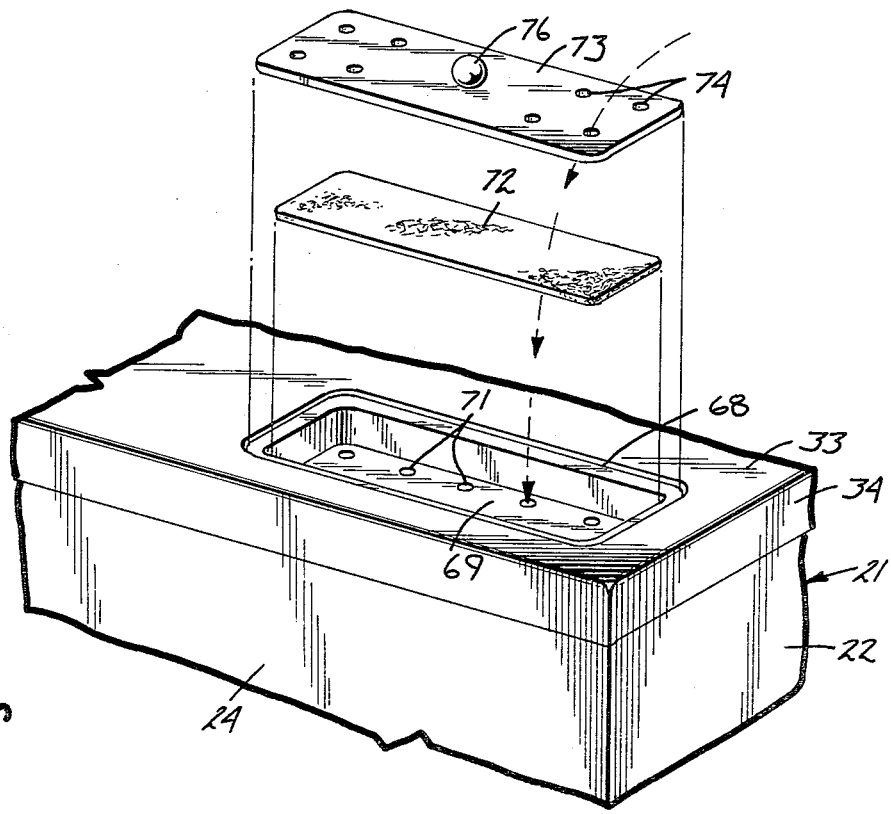
FIG. 6 is a fragmentary perspective view of the left front corner of the unit of FIG. 3.

Referring to FIG. 6, top wall 33 has a rectangular recess 68. Recess 68 has a bottom wall 69 provided with a plurality of small holes 71. A pad 72 of absorbent material is located in recess 68 adjacent bottom wall 69. Pad 72 can be small pouches or containers of odorant carrying material. Pad 72 is adapted to hold air freshener or scent materials or liquids. A rectangular cover 73 fits into recess 68 to hold pad 72 adjacent bottom wall 69. Cover 73 has a plurality of air holes 74 and a top knob 76. Knob 76 is used to facilitate the removal of cover 73 from top wall 33.

Returning to FIGS. 4 and 5, an elongated tank indicated generally at 77 is slidably disposed in chamber 35 on bottom wall 27. Tank 77 has a pair of longitudinal upright side walls 78 and 79 joined to upright end walls 81 and 82. All of the walls 78, 79, 81, 82 are integral with a generally flat bottom wall 83. Wall 82 has an upper longitudinal extension, indicated generally at 84, adapted to move through a hole 86 in end wall 24. The wall 82 is engageable with wall 24 so as to limit movement of the tank 77 relative to wall 24. Tank 77 has a chamber 87 co-extensive with extension 84 for holding a liquid, such as water. A plate 88 is attached to the forward wall 85 of extension 84 with a knob nut 89 and bolt 91. Wall 85 and plate 88 close the opening or hole 86 when the tank 77 is fully installed within the housing 21. Knob nut 89 serves as a grip member to facilitate the sliding of tank 77 along bottom wall 27, as shown in broken lines in FIG. 5. When tank 77 is pulled to the out position, the top of extension 84 is open so that additional liquid can be poured into tank chamber 87 without removing tank 77 from housing 21.

A vapor plate or pad, indicated generally at 92, is mounted on tank wall 78 to facilitate the evaporation of liquid into the air moving through chamber 35. Plate 92, as shown in FIG. 7, has an elongated rectangular body 94 joined to a downwardly directed leg 96. The midportion of body 94 has an outwardly directed tab or toe 97 adjacent an opening 98. The body 94, leg 96, and tab 97 are a one-piece fiber material that absorbs the liquid in the tank so that the entire plate is wet. The air moving across the wet surfaces of plate 92, indicated by arrow 99, increases the evaporation of the liquid from plate 92. As shown in FIG. 4, plate 92 is mounted on tank side wall 78 with leg 96 extended down toward the bottom wall 83 of the tank. Tab 97 fits over the top edge of wall 78 to hold the plate on wall 78. Other types of liquid carrying plates or members can be used to enhance the evaporation of the liquid stored in tank chamber 87 and increase the moisture content of the air flowing through chamber 35.

Referring to FIGS. 8, 9, and 10, there is shown a modification of the gas cleaning unit of the invention indicated generally at 100. Unit 100 has an elongated rectangular box-shaped housing 101 having an upright rectangular front wall 102. Front wall 102 has a pair of circular gas outlet openings 103 and 104. Grid members 106 and 107 extend across openings 103 and 104. Housing 101 is completed with an upright back wall 108 and end walls 109 and 111. All of the walls 102, 108, 109, and 111 are attached to a bottom wall 112. Bottom wall 112 has an upright peripheral lip or flange 113 that overlaps the walls 102, 108, 109 and 111 and attach thereto with suitable adhesive or bonding material. Bottom wall 112, as shown in FIG. 10, has three pairs of downwardly directed feet 114 adapted to support the unit on a surface. A longitudinal upwardly directed rib 116 extends along the longitudinal length of bottom wall 112 and cooperates with the liquid carrying tank 142 to guide the tank for longitudinal movement along bottom wall 112.

Housing 101 has a top wall 117 enclosing the housing chamber 118. Top wall 117 has a downwardly directed flange 117A that overlaps the upper edge of the walls 102, 108, 109, and 111 and is secured thereto with suitable bonding or adhesive material. Top wall 117 has a pair of openings 119 and 122 to allow air to flow into chamber 118. First opening 119 is covered with an open rectangular grid member 120. A transverse cross member 121 separates openings 119 and 122. Each opening 119 and 122 has a rectangular bottom shoulder 123 and a pair of linear upper shoulders 124. Filter means are located in each opening to filter smoke, pollens, odors, and particulate foreign contaminants from the air moving through the filter means. The filter means comprises a first fabric or fiber filter 126 and a second particle filter 127. Filters 126 and 127 can be identical to the filters 39 and 40. Second filter 127 fits into the opening 122 and rests on the bottom shoulder 123. Grid member 128 is located over the first filter 126 and rests on the pair of upper shoulders 124. The outer sides of grid members 120 and 128 are in tight fit relationship with the walls surrounding openings 119 and 122.

Air moving means indicated generally at 129 are located in chamber 118 under each grid members 120 and 128. One air moving means has an electric motor 130 mounted on a support 131. Support 131 is attached to bottom wall 112. Motor 130 is operatively coupled to a rotatable fan 132. Fan 132 can be constructed in accordance with the hub and blade 61 and 62, as shown in FIG. 4. The other air moving means has a second motor 133 mounted on a support 134. Motor 133 drives the fan 136 to move air through the outlet opening 104.

Motors 130 and 133 are electrically connected to a switch having a manually operated control 137. The switch is mounted on the top wall adjacent grid member 120 next to a light 138. When the light 138 is ON, control 137 activates the switch to supply power to motors 130 and 133. The motors 130 and 133 rotate fans 132 and 136 and thereby move air through the filtering means, chamber 118, and discharge the air through the outlet openings 103 and 104.

Top wall 117 has a recess closed with a removable cover 139. Cover 139 has holes 141 which allow a limited amount of air to move through the cover into chamber 118. A pad, such as pad 72, is located below cover 139. An air freshening liquid or material can be carried by the pad so that the air moving through the pad will pick up air freshening material and be mixed with the air flowing through chamber 118. A knob 140 attached to the center of cover 139 is used to facilitate the removal of cover 139 from top wall 117.

Referring to FIG. 9, en elongated rectangular tank 142, which has structure similar to the tank 77 as shown in FIG. 5, is located in chamber 118 adjacent the inside of side wall 108. Tank 142 has a longitudinal extension 143 adapted to extend through a hole in end wall 111. A knob 144 attached to extension 143 is used to longitudinally slide tank 142 in the housing to expose the open upper part of extension 143 to facilitate the pouring of liquid into tank 142. Rib 116 is located adjacent the bottom of the tank and serves to locate and guide the tank along bottom wall 112. Plates or pads can be (not shown) mounted on the side wall of tank 142 to facilitate the evaporation of the liquid in tank 142. These plates can be identical to the plate 92 shown in FIG. 7.

Referring to FIGS. 11–13, there is shown a second modification of the gas cleaning unit indicated generally at 200. Unit 200 is a portable air cleaning apparatus adapted to be used in the driving or living compartment of a vehicle, including a car, travel trailer, motor home or the like. Unit 200 is usable to filter odors, smoke, dust and particulates from the air within the vehicle.

Unit 200 has a generally box-shaped housing 201 having an upright front wall 202 and end walls 203 and 204. End wall 203 has a rectangular outlet opening 206 along the bottom portion thereof. An open rectangular grid member 207 extends across the outlet opening 206. As shown in FIG. 12, grid member 207 is attached to the inside of wall 203. Wall 204 has a rectangular discharge opening 208 in the lower portion thereof. A grid member 209 located adjacent the inside of wall 204 extends across opening 208. Housing 201 has a bottom wall 211 provided with an upwardly directed lip or flange 212. Flange 212 overlaps the lower portions of the walls 202, 203, and 204 and the back wall and is secured thereto with suitable adhesive or bonding material.

As shown in FIGS. 12 and 13, bottom wall 211 has two pairs of feet 213 and 214 to support the unit on a surface. Feet 213 and 214 have an arched or concave surface 216 so that the unit can be placed on a convex surface, such as the floor transmission bump of an automobile. A band of hook elements 217 are secured to the outer surfaces of the feet 213 and 214 and extend along the arched surface 216. The hooked elements can be the band of hooked elements, as disclosed in U.S. Pat. No. 3,534,780. The lower portions of feet 213 and 214 have flat sections 213A which permit the feet to be located in surface engagement with flat surfaces indicated by the line 218. The arched surface 216 is engageable with an arched or humped surface indicated by the broken line 219.

Housing 201 has a top wall 220 having a downwardly directed flange 221 lapped over a portion of the top of walls 202, 203, and 204 and the back wall. Suitable bonding or adhesive materials secure flange 221 to these walls. Top wall 220 has an inlet opening 222 surrounded by a bottom rectangular shoulder 223 and a pair of upper shoulders 224. Air filtering means are located in inlet opening 222. The air filtering means includes a first fiber filter 226 and a second particle filter 227. Filters 226 and 227 are identical to the filters 39 and 40. An open grid member 228 fits into the inlet opening and rests on the shoulders 224 on top of the filter 226. The outer sides of grid member 228 are in a tight fit relationship with the walls surrounding opening 222.

Housing 201 has a chamber 229 divided by a mid or intermediate wall 231. Wall 231 has a center circular opening 232 allowing air to flow through chamber 229. An air moving means indicated generally at 230 and located in chamber 229 operates to move air through inlet opening 222 and filters contained therein and discharge the air through the outlet openings 206 and 208. The air moving means 230 includes a D.C. motor 233 drivably connected to a blade member or fan 234. Fan 234 is located within opening 232 of wall 231. The motor 233 and fan 234 are supported on wall 231 with a plurality of outwardly directed resilient support arms 236. A bolt 237 secures the mid-sections of the support arms to the motor. The outer ends of support arms 236 can be attached with resilient pads to wall 231. Other structures can be used to mount motor 233 on wall 231.

The electrical power to motor 233 is controlled with a switch 238 mounted on top wall 220. Switch lines 239 connect switch 238 to motor 233. Power lines 240 couple switch 238 to a power source, such as the battery of the vehicle. An adapter plug 241 has a construction to fit into the cigarette lighter adapter or similar adapter whereby the line 240 can be electrically coupled to the battery of the vehicle. Switch 238 has a manually operated control knob 242 used to turn the motor on and off and regulate the speed of motor 233.

As shown in FIG. 12, top wall 220 has a recess 243 for accommodating an absorbent pad 248. Pad 248 rests on a bottom wall 244 having a plurality of holes 246. A cover 249 having holes 251 is located in recess 243 above pad 248. A knob 252 is secured to the top of cover 249 and is used to facilitate removal of cover 249 from top wall 220. Pad 248 is used to carry air freshening liquid or solid materials.

In use, switch 238 is turned on to connect the power source, as the vehicle battery, to D.C. motor 233. The speed of motor 233 is controlled by turning control knob 242. Motor 233 drives fan 234 to move air through chamber 229. External air is drawn through grid 228 and filters 226 and 227. The filters 226 and 227 operate to remove the foreign contaminants, as smoke, pollens, odors, dust and particulates, from the air. The clean air is moved by fan 234 through the opening 232 in the intermediate wall 231. The air is discharged through both exit openings 206 and 208.

While there has been shown and described the preferred embodiments of the gas cleaning apparatus of the invention, it is understood that changes in the structures, materials of construction, and arrangement of structure can be made by those skilled in the art without departing from the invention. The invention is defined in the following claims.

The embodiments of the invention in which an exclusive property or privilege is claimed are defined as follows:

1. A unit for cleaning a gas comprising: housing means having an inside chamber, a first wall having a gas inlet opening, said first wall including a side wall surrounding the gas inlet opening and projected into the chamber and an inwardly extending lip on the side wall surrounding and directed into the inlet opening, and a second wall having a gas outlet opening, gas filter means located in the gas inlet opening and supported on the lip, said gas filter means including a first fiber filter operable to remove particulate matter from the gas moving through the first filter, and a second filter having a particulate medium operable to remove foreign contaminants from the gas moving through the second filter, said second filter being engageable with said lip, said first filter being located over the second filter adjacent the gas inlet side thereof, said side wall including shoulder means located on opposite portions of the side wall, said shoulder means extended in a direction opposite the inward extension of the lip whereby the gas filter means can be removed from the gas inlet opening, open grid means located over the first filter of the gas filter means, said open grid means having outer peripheral surfaces located in tight fitting relationship with the side wall and portions engageable with said shoulder means to support the open grid means on the first wall, said housing means having a third wall and a bottom wall, said third wall having an opening located above the bottom wall, tank means located in the chamber and movably supported on the bottom wall for storing a liquid, said tank means having an extension located in the opening in the third wall, said tank means being provided with means to close the opening in the third wall and an end wall engageable with the third wall to limit movement of the tank means relative to said third wall, said tank means being movable to a first position to provide access to the tank means from the outside of the housing means and movable from the first position to a second position to close the opening in the third wall with the means to close the opening in the third wall, and means located in the chamber operable to move gas through the gas filter means to remove foreign matter from the gas and discharge cleaned gas from the chamber through the gas outlet opening.

2. The unit of claim 1 wherein: the first wall has a plurality of gas inlet openings, each opening having a side wall surrounding the opening and a lip on the side wall, and gas filter means located in each gas inlet opening and supported on the lip therein.

3. The unit of claim 2 wherein: the means operable to move gas through the gas filter means comprise a plurality of motor operated fans.

4. The unit of claim 2 including: open grid means located over each gas filter means, each grid means having outer peripheral surfaces located in tight fit relationship with the adjacent side wall.

5. The unit of claim 4 wherein: each side wall includes shoulder means for supporting the grid means associated therewith.

6. The unit of claim 5 wherein: each shoulder means comprises a pair of shoulders located on opposite portions of each side wall.

7. The unit of claim 1 wherein: the particulate medium of the second filter is charcoal.

8. The unit of claim 1 wherein: the means operable to move gas includes an electric motor and fan means drivably connected to the motor.

9. The unit of claim 8 wherein: the housing means has a means mounting the motor on the bottom wall.

10. The unit of claim 1 including: means mounted on the tank means for carrying liquid to increase the moisture content of the gas flowing through the chamber.

11. The unit of claim 1 wherein: the bottom wall has an elongated rib located adjacent the tank means to guide the tank means along said bottom wall.

12. The unit of claim 1 wherein: the housing means has a recess in the first wall to accommodate pad means for holding gas freshener means, and cover means located over the pad means for closing the recess, said cover means and bottom of the recess having holes to allow gas to flow through the pad means into the chamber.

13. The unit of claim 1 wherein: the housing means has an ON-OFF switch means mounted on the first wall, said means operable to move gas including an electric motor connected to the switch means and fan means drivably connected to the electric motor.

14. The unit of claim 1 including: an open grid means mounted on the second wall and extended over the gas outlet opening, sleeve means adjacent the open grid means and projected into the chamber, said means operable to move gas including fan means having at least a portion located within the sleeve means, and means to rotate the fan means.

15. The unit of claim 14 wherein: the particulate medium is charcoal.

16. A unit for cleaning a gas comprising: housing means having an inside chamber, a first wall having a gas inlet opening and a second wall having a gas outlet opening, gas filter means located over the gas inlet opening and mounted on the first wall, means located in the chamber operable to move gas through the filter means to remove foreign matter from the gas and discharge clean gas from the chamber through the gas outlet opening, and tank means located in the chamber for carrying a liquid, and means associated with the tank means for carrying liquid to increase the moisture content of the gas flowing through the chamber, said housing means having a side wall having an opening, said tank means having an extension located in said opening, said tank means being provided with means to close the opening in said side wall and means engageable with said side wall to limit movement of the tank means relative to said side wall, said tank means being movable to a first position relative to the side wall providing access to the tank means from the outside of the housing means whereby liquid can be placed in the tank means from outside of the housing means and movable from the first position to a second position to close the opening in the side wall.

17. The unit of claim 16 wherein: the housing means has a bottom wall having an elongated rib located adjacent the tank means to guide the tank means along said bottom wall.

18. The unit of claim 16 wherein: the means associated with the tank means for carrying liquid comprise a plurality of vapor plates mounted on the tank means.

19. The unit of claim 16 wherein: the housing means having a recess in the first wall to accommodate pad means for holding gas freshener means accommodating a gas freshener, and cover means located over the pad means for closing the recess, said cover means and bottom of the recess having holes to allow gas to flow through the pad means into the chamber whereby the gas freshener is co-mingled with the gas flowing through said chamber.

20. The unit of claim 16 wherein: the means operable to move gas includes at least one electric motor and fan means drivably connected to the electric motor.

21. The unit of claim 16 including: open grid means located over the gas filter means.

22. The unit of claim 16 including: open grid means mounted on the second wall and extended over the gas outlet opening.

23. The unit of claim 16 wherein: the first wall has a plurality of gas inlet openings, and a plurality of gas filter means extended across each gas inlet opening and supported on the first wall.

24. The unit of claim 23 wherein: the means operable to move gas through the gas filter means comprise a plurality of motor operated fans.

* * * * *